United States Patent
Gaudio et al.

(10) Patent No.: US 10,589,491 B2
(45) Date of Patent: Mar. 17, 2020

(54) REMOVABLE AND RE-ATTACHABLE ROOF SYSTEM FOR MODULAR RESIDENTIAL CONSTRUCTION

(71) Applicant: Module Design, Inc., Pittsburgh, PA (US)

(72) Inventors: Brian Gaudio, Pittsburgh, PA (US); Hallie Dumont, Pittsburgh, PA (US)

(73) Assignee: Module Design, Inc., Pittsburgh, PA (US)

(*) Notice: Subject to any disclaimer, the term of this patent is extended or adjusted under 35 U.S.C. 154(b) by 244 days.

(21) Appl. No.: 15/489,577

(22) Filed: Apr. 17, 2017

(65) Prior Publication Data

US 2017/0298614 A1    Oct. 19, 2017

Related U.S. Application Data

(60) Provisional application No. 62/323,655, filed on Apr. 16, 2016.

(51) Int. Cl.
*E04H 1/02*       (2006.01)
*B32B 7/08*       (2019.01)
(Continued)

(52) U.S. Cl.
CPC .............. *B32B 7/08* (2013.01); *B32B 3/263* (2013.01); *E04B 1/34315* (2013.01); *E04B 7/22* (2013.01);
(Continued)

(58) Field of Classification Search
CPC . E04B 9/003; E04B 7/24; E04B 1/343; E04B 1/34315; E04B 7/20; E04B 7/22;
(Continued)

(56) References Cited

U.S. PATENT DOCUMENTS 3,216,156 A * 11/1965 Carew .................. E04B 1/24
52/94
3,694,977 A   10/1972 Verman
(Continued)

FOREIGN PATENT DOCUMENTS

DE      10026349 A1 * 12/2001
EP        310926 A1 *  4/1989
(Continued)

OTHER PUBLICATIONS

Invention Disclosure Statement for "Carpentry Finish at Corner Steel Connection for quick onsite assembly", Blu Homes, 2010, 1 page.
(Continued)

*Primary Examiner* — Joshua J Michener
*Assistant Examiner* — Charissa Ahmad
(74) *Attorney, Agent, or Firm* — K&L Gates LLP (57) ABSTRACT

The present disclosure describes a residential dwelling unit designed for vertical expansion by way of a removable and re-attachable roof system. By removing certain components of the original dwelling unit's roof, that same structure can be converted into the floor of a subsequent vertical addition. Specific components that were removed from the original roof are then re-attached on top of the vertical addition.

14 Claims, 9 Drawing Sheets

(51) Int. Cl.
*E04D 3/36* (2006.01)
*E04B 7/22* (2006.01)
*B32B 3/26* (2006.01)
*E04B 1/343* (2006.01)
*E04B 7/24* (2006.01)

(52) U.S. Cl.
CPC ........ *E04D 3/3601* (2013.01); *B32B 2250/03* (2013.01); *B32B 2307/304* (2013.01); *B32B 2307/712* (2013.01); *B32B 2307/7242* (2013.01); *B32B 2307/7246* (2013.01); *B32B 2307/732* (2013.01); *B32B 2419/06* (2013.01); *E04B 1/34321* (2013.01); *E04B 7/24* (2013.01); *E04H 1/02* (2013.01); *Y02B 10/12* (2013.01)

(58) Field of Classification Search
CPC . E04B 1/35; E04B 2001/3561; E04D 3/3601; H02S 20/23
See application file for complete search history.

(56) References Cited

U.S. PATENT DOCUMENTS

| | | | | |
|---|---|---|---|---|
| 3,738,068 | A * | 6/1973 | Attaway | E04D 13/155 52/60 |
| 3,755,976 | A * | 9/1973 | Dolhaine | E04B 1/14 52/93.1 |
| 3,983,665 | A | 10/1976 | Burton | |
| 4,077,171 | A * | 3/1978 | Simpson | E04B 7/105 52/96 |
| 4,467,585 | A * | 8/1984 | Busby | E04B 1/35 52/122.1 |
| 4,557,081 | A * | 12/1985 | Kelly | E04D 5/14 52/199 |
| 4,620,404 | A * | 11/1986 | Rizk | E04B 1/3483 52/235 |
| 4,635,412 | A | 1/1987 | Le Poittevin | |
| 4,640,070 | A * | 2/1987 | Moffat | E04B 1/35 52/236.3 |
| 4,780,996 | A | 11/1988 | Julien, Jr. | |
| 4,852,314 | A * | 8/1989 | Moore, Jr. | E04B 7/22 52/199 |
| 4,858,406 | A * | 8/1989 | Lane | E04D 3/405 52/300 |
| 4,888,930 | A * | 12/1989 | Kelly | E04D 3/3601 52/410 |
| 5,067,289 | A | 11/1991 | Ouderkirk et al. | |
| 5,433,050 | A * | 7/1995 | Wilson | E04D 13/172 52/281 |
| 6,434,895 | B1 | 8/2002 | Hosterman et al. | |
| 7,451,572 | B1 * | 11/2008 | Inzeo | E04D 3/405 52/300 |
| 7,665,251 | B1 * | 2/2010 | Lang | E04B 1/24 52/236.6 |
| 7,735,267 | B1 * | 6/2010 | Ayers, Jr. | E04D 13/155 52/302.6 |
| 7,849,644 | B2 * | 12/2010 | Melesky | E04B 9/003 49/463 |
| 8,001,730 | B2 | 8/2011 | Wallance | |
| 8,191,336 | B2 * | 6/2012 | Roberts | E04D 13/158 269/41 |
| 8,474,194 | B2 | 7/2013 | Tiramani | |
| 8,567,144 | B2 * | 10/2013 | Kelly | E04D 13/1643 52/408 |
| 8,739,475 | B2 | 6/2014 | Michaud et al. | |
| 8,943,759 | B2 | 2/2015 | Warner et al. | |
| 8,991,134 | B2 | 3/2015 | Wheeler | |
| 9,121,168 | B2 | 9/2015 | Levy et al. | |
| 9,382,703 | B2 * | 7/2016 | Quinn | E04B 1/24 |
| 2001/0047628 | A1 * | 12/2001 | Mouton | E04B 1/3483 52/144 |
| 2005/0283371 | A1 | 12/2005 | Tiramani | |
| 2006/0059792 | A1 | 3/2006 | Tiramani | |
| 2007/0261346 | A1 * | 11/2007 | Kelly | E04G 21/00 52/408 |
| 2012/0279142 | A1 | 11/2012 | Michaud | |
| 2013/0232886 | A1 * | 9/2013 | Yoder | E04B 1/34315 52/79.1 |
| 2013/0269264 | A1 * | 10/2013 | Brewerton | E04B 1/98 52/1 |
| 2013/0318895 | A1 * | 12/2013 | Geary | E04D 11/00 52/173.3 |
| 2014/0047780 | A1 * | 2/2014 | Quinn | E04H 1/02 52/23 |
| 2014/0338278 | A1 * | 11/2014 | Segall | E04H 1/1205 52/586.1 |
| 2016/0032587 | A1 | 2/2016 | Michaud et al. | |
| 2017/0321420 | A1 * | 11/2017 | Duffus | E04B 7/22 |

FOREIGN PATENT DOCUMENTS

| | | | | |
|---|---|---|---|---|
| EP | 1683923 | A2 | 7/2006 | |
| FR | 2447428 | * | 8/1980 | |
| GB | 2084213 | A * | 4/1982 | .......... E04B 1/3483 |
| GB | 2092640 | A * | 8/1982 | .......... E04B 1/3483 |
| GB | 2191225 | A * | 12/1987 | .......... E04B 1/0007 |
| JP | 05118102 | A * | 5/1993 | ............. E04D 12/00 |

OTHER PUBLICATIONS

Invention Disclosure Statement for "Dual-side unfolding building", Blu Homes, 1 page.

\* cited by examiner

REMOVABLE AND RE-ATTACHABLE ROOF SYSTEM FOR MODULAR RESIDENTIAL CONSTRUCTION

CROSS REFERENCE TO RELATED APPLICATIONS

This application claims the benefit under 35 U.S.C. § 119(e) of the earlier filing date of U.S. Provisional Patent Application No. 62/323,655, filed on Apr. 16, 2016, entitled REMOVABLE AND RE-ATTACHABLE ROOF SYSTEM FOR MODULAR RESIDENTIAL CONSTRUCTION, the entire disclosure of which is hereby incorporated by reference.

TECHNICAL FIELD

This specification generally relates to roof system assemblies and more particularly to removable and re-attachable roof systems for modular structure construction.

BACKGROUND

In the design and construction of structures, such as industrial warehouses, commercial buildings, and residential homes the builders and designers focus on the identified needs of the occupants and design and build a structure to meet their needs. While this type of design affords the occupants a structure that meets their currently identified requirements, overtime, the needs of the occupants change and the original design of the structures become obsolete.

With businesses and personal structures, it is often difficult to accurately plan and project for the future needs. Underbuilding to meet current financial needs of the occupants oftentimes results in the occupants requiring to move and obtain additional or new structures, while overbuilding can lead to increased costs of up keeping a facility and the possibility that the needs of the occupant will never expend to fully utilize the space. Thus, the current building methods involve a substantial amount of speculation and are often overbuilt for the current needs of the occupants.

When the occupants eventually outgrow their current structures, they oftentimes are required to look for additional buildings or structures. The process of purchasing additional real estate can be time consuming, difficult, and expensive depending on the market. For example, when a family "outgrows" a residential structure, they move to a different to a home with more square footage. The moving process can be quite stressful, time intensive, and expensive. To prevent moving, some families add onto their existing home by adding another story. Adding an additional story onto an existing house is not easy; it's time consuming and costs the homeowner a significant sum of money.

When adding a second story onto a single story home, contractors first must demolish the existing portions of the structure, such as the roof, walls, and interior portions of the structure. The process of removing the roof, for example, begins by tearing off shingles, ripping up flashing, and removing insulation. Because these materials are nonremovably adhered to each other, either through nails or adhesive, once removed they are rendered useless and cannot be re-used. This demolition process produces a significant amount of waste and takes a considerable amount of labor to execute. The next step in traditional second floor addition process is to build a floor for the second story addition. The floor for the second story addition is located where the previous roof structure was located and the structure must be secured and strengthen to support the additional load of the second (or possibly third, fourth, etc.) story. This process requires significant amounts of labor, materials, and time to accomplish. Finally, after adding the second story walls, a new roof is built and sealed in place on top of the second story. Designing a residential structure with the intent of expanding vertically can eliminate many of these steps, making the addition process much simpler.

Moreover, if the current occupants desire a complete move, then the costs of selling their current facilities creates additional costs. On the other hand, the occupants could seek to expand and add additions onto the current structure. The current methods of additions often require complete redesign of the structures, additional structural components and the removal and disposal of significant portions of the existing structures such as the roofs, walls, and interior sections of the structure.

SUMMARY

This specification describes vertically expandable building structures, for example, residential dwellings.

In one example, a residential dwelling comprises a removable roof structure that permits an additional story (or stories) to be built onto the original unit. This expandability is achieved through a modular removable roof system that can be attached, removed, and reattached to the structure. The removable roof system is removable without compromising the roof's structural capacity or performance. The removable roof assembly may comprise insulation, weather barrier, and fascia which are all easily removed from the original roof without damaging the components themselves or the roof structure. Additionally, a panel the width of a staircase (i.e. 3 ft. to 4 ft. wide and 10 ft. to 12 ft long) in the original roof framing is designed for removal. Removing this panel provides the necessary space to insert a staircase, vertically connecting the original dwelling with the addition that sits on top of it. Once the extra story or stories are attached to the original dwelling, the insulation, weather barrier, and fascia from the original dwelling's roof are re-attached to the roof structure of the vertical addition through the removable roof attachment system.

BRIEF DESCRIPTION OF THE DRAWINGS

Various features and characteristics of a removable roof system described in this specification may be more thoroughly understood by reference to the accompanying figures, in which:

FIGS. 1A-F illustrate the process of removing a removable roof system, adding an additional story onto an original residential dwelling, and reattaching the removable roof system, where:

FIGS. 4A-B illustrate FIG. 1B in a three dimensional view, illustrating one method for removing the roof from the original dwelling unit where:

FIGS. 5A-B illustrate FIG. 1B in a three dimensional view, illustrating an alternative method for removing the roof from the original dwelling unit where:

The reader will appreciate the foregoing features and characteristics, as well as others, upon considering the following detailed description of the removable roof system according to this specification.

DETAILED DESCRIPTION

This specification is generally directed to removable roof systems for use with modular building structures. However, they are not limited to such extemporary environments.

Generally speaking, numerous embodiments described throughout the specification can be used in the construction of modular structures, prefabricated structures, as well as site-built structures. The removable roof system can allow modular structures to grow and expand as well as contrast as the needs of the building owners/occupants change. In one embodiment, the removable roof system may permit the expansion of a modular residential structure from a one story flat to a multistory home. In addition, the removable roof system may permit a multistory home to be converted into a single story flat.

In other embodiments, the removable roof structure may allow for the replacement of roofs on structures designed as permanent buildings. In one embodiment, the removable roof system may allow a building owner to easily replace a roof structure that has exceeded its useful life. The ease of removal and replacement with the removable roof system can reduce labor costs and replacement roof structures can be constructed offsite and shipped to the location of the building which can reduce the time and labor costs associated with replacing a roof structure. Additionally, the removable roof system may also facilitate the easy removal and replacement of roof components as roof technology improves.

In another embodiment, the removable roof system may comprise thermal electricity generation means, such as solar panels or solar shingles. The removable roof system, with its ease of installation and removal, can permit the building owner to add and swap-out older roof technology with newer roof technology with significantly reduced installation costs with the removable roof system.

Figure 1A:
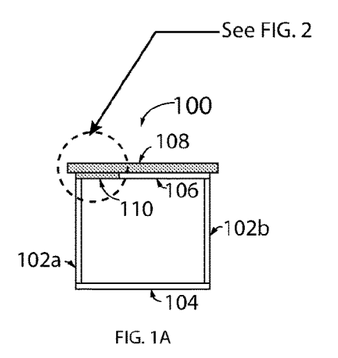
FIG. 1A illustrates a section view of the original dwelling unit.

FIGS. 1A-F illustrate the process of removing a removable roof system, adding an additional story onto an original residential dwelling, and reattaching the removable roof system. Referring to FIG. 1A, the original dwelling unit 100 is comprised of four vertical walls 102a, 102b, 102c (not depicted), and 102d (not depicted), a floor 104, a roof substructure 106, and a removable roof system comprising assemblies 108 and 110. The removable upper roof assembly 108 is comprised of insulation, fascia, weather barrier, and sheathing. The removable roof assembly/vertical circulation panel 110 comprises a removable vertical circulation panel comprised of rafters and sheathing. The removable roof assembly 110, when removed permits the installation of a vertical staircase to connect to the vertical addition. The upper roof system 108 is mechanically fastened to the original dwelling unit via connection points along vertical walls 102a-d. The removable roof assembly 110 comprising the vertical circulation panel is positioned where the future staircase will be added to original dwelling unit 100. The vertical circulation panel has the same footprint dimensions (length and width) as the staircase that will rise up below it. This vertical circulation panel is constructed in the same manner as the roof structure 106, with rafters and sheathing, but it is separately framed as its own panel and mechanically fastened to the roof structure 106. The separate framing of the removable roof assembly 110 allows the roof structure 106 to maintain its structural stability when the removable roof assembly 110 is removed. In addition, the roof structure 106 is also framed around the removable roof assembly 110 to allow for the secure attachment of a staircase when the original dwelling unit 100 is expanded vertically.

Figure 1B:
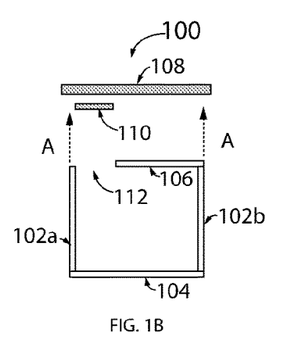
FIG. 1B illustrates the original dwelling unit from FIG. 1A with the removable roof system in the process of removal.

Now referring to FIG. 1B, the upper roof assembly 108 and the vertical circulation panel 110 are in the process of removal as shown by Arrow A, which illustrates the vertical removal of the upper roof assembly 108 and the vertical circulation panel 110. Alternatively, the upper roof assembly 108 and/or the vertical circulation panel 110 may be slidably received by a grooved slot of the vertical walls 102a-d and/or the roof substructure 106. The slidable mating relationship (in the form of a male-female connection) may allow of the roof structure to slide along the longitudinal axis and/or the transverse axis of the original dwelling unit 100. The slidable relationship between the upper roof assembly 108 and the original dwelling unit 100 can be achieved, for example, though a caster system which permits the removal of the removable roof assemblies along the longitudinal axis and/or the transverse axis of the original dwelling unit 100.

In either of the embodiments described above, the upper roof 108 can be removed by unfastening the connection points on the perimeter of the original dwelling unit 100. These connections points are located periodically along vertical walls 102a-d at intervals dictated by the International Building Code. The removable vertical circulation panel 110 can be disconnected from the main substructure by unfastening various connection points to the roof substructure 106. The removal of the vertical circulation panel 110 provides an open space 112, which can receive a staircase.

Figure 1C:
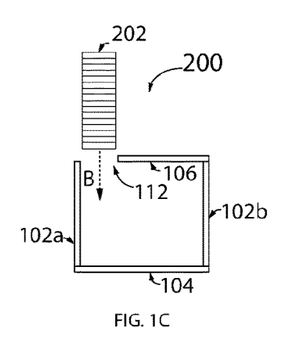
FIG. 1C illustrates a staircase in the process of insertion in the original dwelling unit from FIG. 1A.

Now referring to FIG. 1C, the staircase 202 is illustrated in the process of installation as shown by Arrow B. This illustrates the vertical insertion of the staircase 202 into the open space 112. This new staircase 202 assembly step 200 is illustrated in FIG. 1C. The framing for the staircase 202 can be completely constructed off-site and a crew of laborers standing on the roof structure 106 can lower the staircase 202 inside the original dwelling 100 via the open space 112. Alternatively, a crane can be used to lower the staircase 202 into the open space 112. The framing of the open space 112 may comprise a lip or ridge that is configured to engage and support the staircase 202 as it is permanently and/or removably fastened to the original dwelling unit 100. In another embodiment, the stair may be built on site inside the original dwelling unit 100.

Figure 1D:
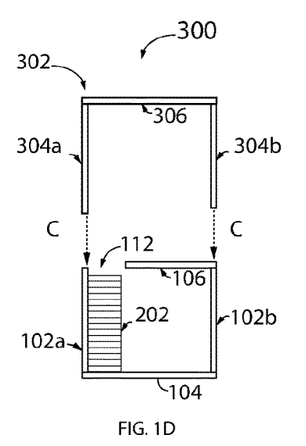
FIG. 1D illustrates an additional dwelling unit in the process of being added onto the original dwelling from FIG. 1A.

Now referring to FIG. 1D, an additional story 302 is illustrated in the process of installation as shown by Arrow C, on top of the original dwelling unit's leftmost vertical support 102a, the unit's rightmost vertical support 102b, the unit's front-most vertical support 102c, the unit's backmost vertical support 102c, and its roof structure 106. This new story 302 assembly step 300 is illustrated in FIG. 1D. The additional story 302 is comprised of four vertical walls 304a, 304b, 304c (not depicted), and 304d (not depicted) as well as a roof structure 306. The additional story 302 can be completely prefabricated offsite, delivered on a flatbed truck, then craned onto the new assembly 200. Alternatively, the additional story can be constructed onsite via a panelized wall system using structural insulated panels (SIPs), traditional lumber framing, or metal studs.

Figure 1E:
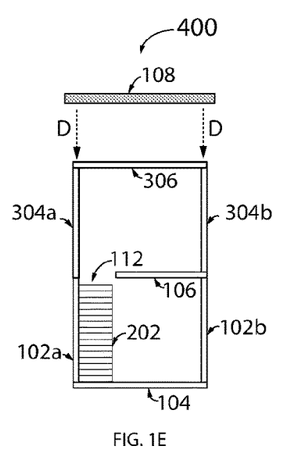
FIG. 1E illustrates the removable roof system from that was removed in FIG. 1B, being re-attached onto the additional dwelling unit from FIG. 1D.

Now referring to FIG. 1E, the upper roof assembly 108 is illustrated in the process of re-attachment as shown by Arrow D onto the roof structure of the additional story 306. This re-attachment assembly step 400 is illustrated in FIG. 1E. The upper roof 108 is reattached in the same manner it was originally fastened to the roof structure 106 of the original dwelling unit 100. The upper roof 108 is mechanically fastened at various connection points along vertical walls 304a-d.

Figure 1F:
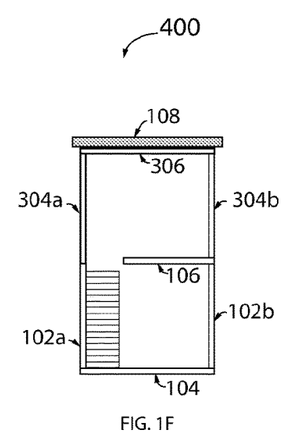
FIG. 1F illustrates the completed assembly, comprised of an original dwelling unit, a staircase, an additional dwelling unit, and a re-attached removable roof system.

Now referring to FIG. 1F, the upper roof assembly 108 is illustrated as being secured to the roof structure of the additional story 306. This completes the vertical addition process. Similarly, it is within the scope of the invention that the steps can be preformed in the same order to add an additional story to the building structure. Moreover, it is also within the scope of the invention that the steps can be completed in the reverse order to remove a second story of a building unit or to replace the roof structure when it has either reached the end of its useful life or if it is desired to replace the existing roof technology with a newer roof technology, such as installing a roof comprising solar panels or shingles. Examples of solar panels and/or shingles which are disclosed in U.S. Pat. Nos. 8,266,846 and 9,166,523, for example, are incorporated herein by reference in their entirety.

The purpose for removing these elements is to add an additional story onto the existing dwelling 100. Thus, the single story residential structure is designed so that parts of its roof are removable. After removing certain parts of the roof, a second story can be placed on top of the first floor. The various embodiments of the removable roof system are discussed in greater detail with respect to FIGS. 2A-2B, below.

Figure 2:
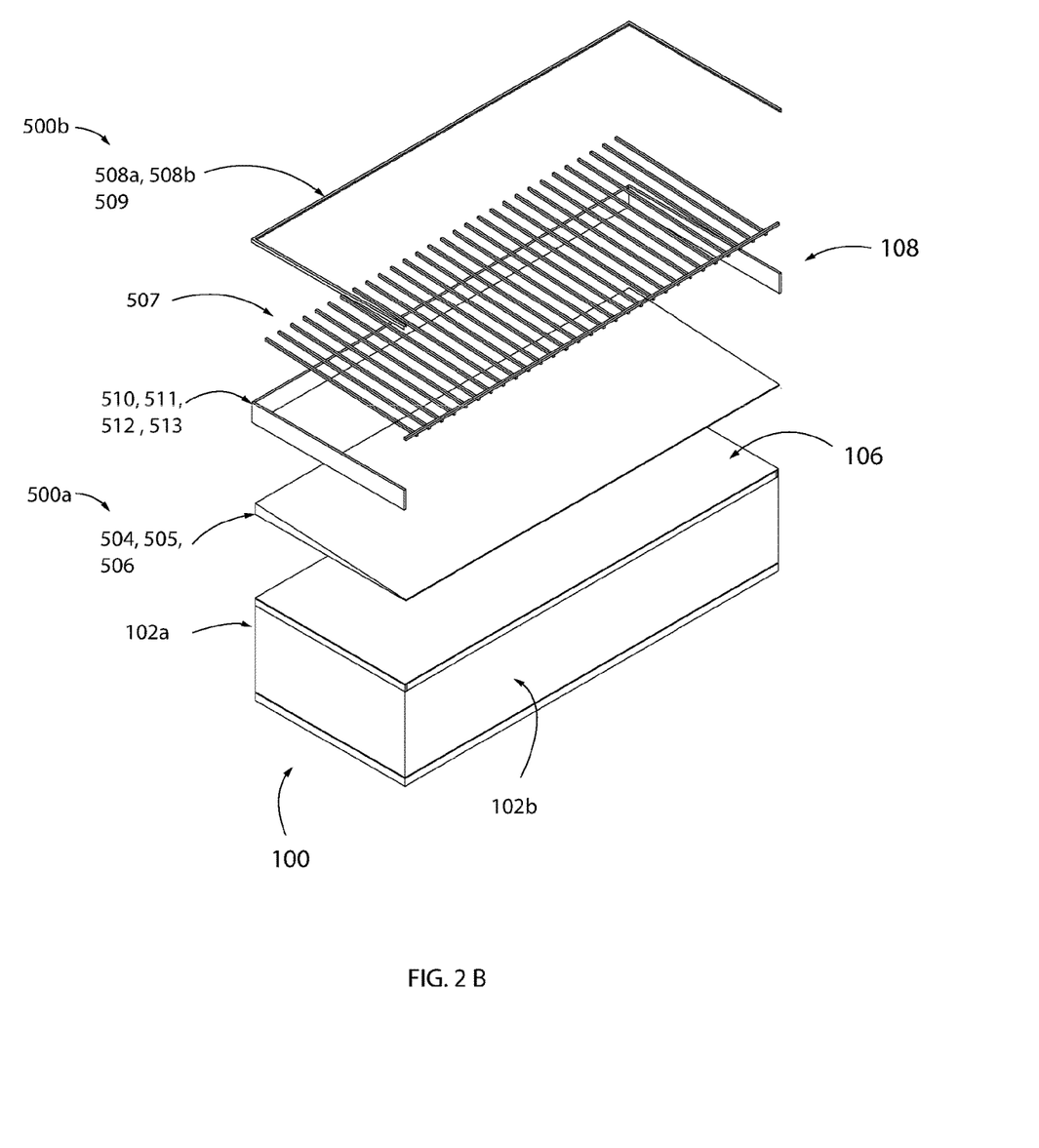
FIG. 2A illustrates a detailed section view of an embodiment of the removable roof system as illustrated in FIG. 1A.
FIG. 2B illustrates an exploded axonometric drawing showing the original dwelling unit's removable and non-removable parts illustrated in FIG. 1A
Figure 2A:
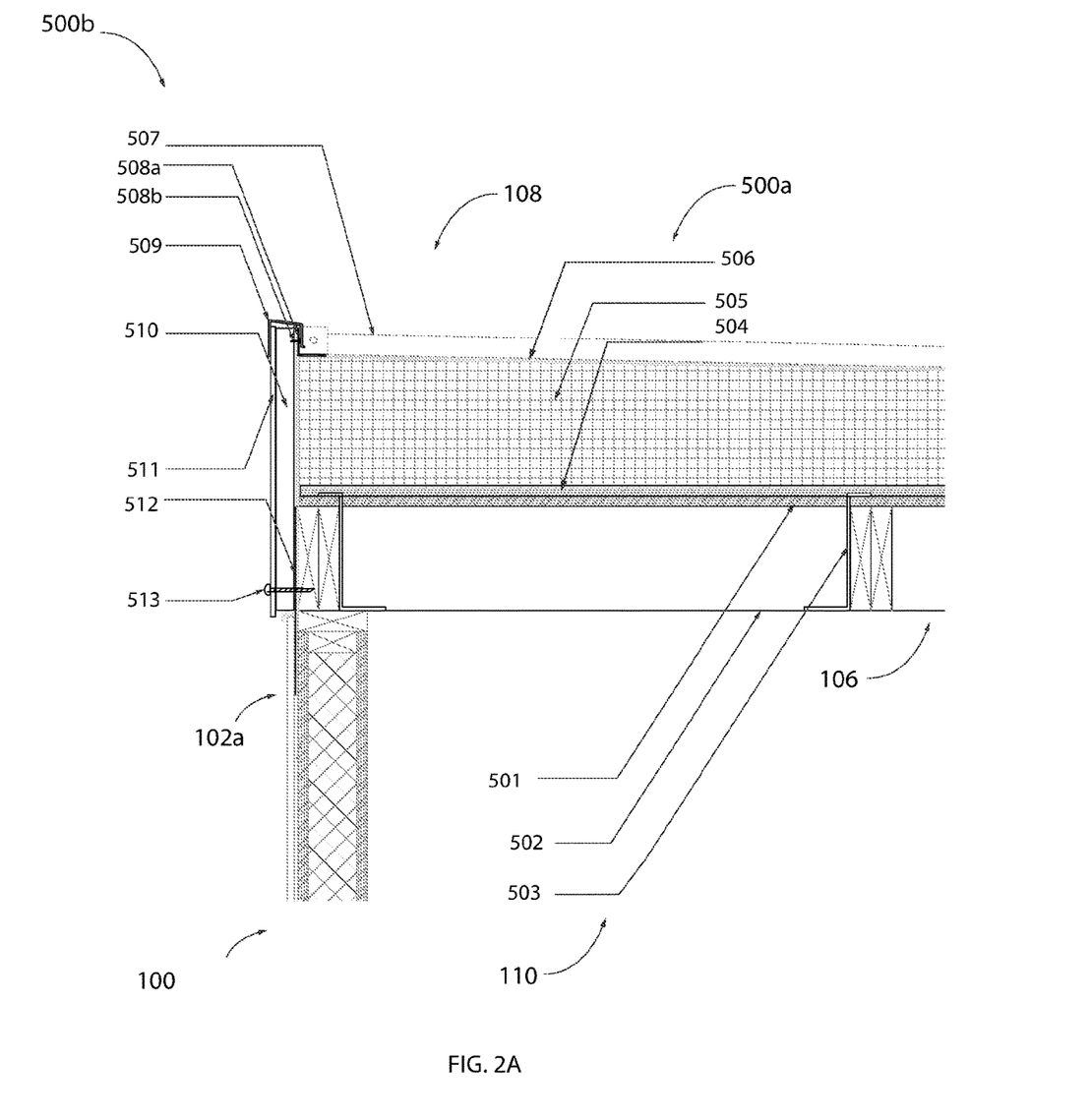

As seen in FIG. 2A, the removable upper roof assembly 108 comprises a weather barrier 500a comprising a substrate 504, an insulation 505, and a vapor and air barrier 506. The upper roof assembly 108 further comprises a compression bracket system 500b which comprises a batten 507, a metal angle 508a, an angle fastener 508b, a coping piece 509, fascia assembly 510 & 511, a steel strap 512, and mechanical fasteners 513. The compression bracket system applies compression force to hold the weather barrier to the original dwelling 100 while also counterbalancing the roof's uplift forces.

The upper roof 108 can be attached to the original dwelling 100 with removable mechanical fasteners spaced around the perimeter of the removable upper roof 108. In one embodiment, the mechanical fasteners are spaced around the perimeter of the upper roof 108 at 1 foot intervals. In another embodiment, the mechanical fasteners are spaced around the perimeter of the upper roof 108 at 2 feet intervals. In another embodiment, the mechanical fasteners are spaced around the perimeter of the upper roof 108 at 3 feet intervals. In one embodiment, the spacing of the mechanical fasteners along the longitudinal axis of the original dwelling unit 100 may be larger, smaller or the same as the spacing of the mechanical fasteners along the axis of the original dwelling unit that is transverse to the longitudinal axis. The various fastener spacing allows for the preservation of the integrity of the materials, and to enable the quick removal of these components for future re-use. In addition, the removable fasteners can be comprised of various materials, such as steel, aluminum, carbon fiber, etc. and based on the material properties of the removable fasteners, the number of fasteners and the spacing of the fasters can vary. Thus, unlike a typical roof installation where the insulation is nailed to the roof substructure and the weather barrier is adhered to the insulation using an adhesive, the rigid insulation 505 is not nailed to the roof substructure, nor is the vapor and air barrier 506 adhered to the insulation. The weather barrier and insulation are removably secured to the roof substructure through a series of battens or spanning members 507 made of aluminum or a comparable material. These battens 507 span the shorter width (i.e. the width transverse to the longitudinal axis) of the building and apply between 8-10 pounds per square foot of pressure, and are attached with a fastener 508b to a metal angle 508a. In alternative embodiments, the battens 507 can apply between 5-15 pounds per square foot of pressure, or alternatively the battens 507 can apply between 5-25 pounds per square foot of pressure.

The fascia, comprised of a furring strip (i.e. 1 inch by 2 inch piece of pressure treated lumber) 510 and an exterior panel (i.e. ⅜ inch fiberglass reinforced concrete panel or coated metal panel) 511, can be fastened to the original dwelling unit 100 through a galvanized steel strap tie 512 and a lag bolt or aluminum C clip fastener 513. Thus, when the owner of the structure is ready to add onto his or her dwelling, one first removes the compression bracket system 500b, freeing the weather barrier 500a as well. The compression bracket system 500b can be unattached by removing the lag bolt or aluminum C clip fastener 513 from vertical walls 102a and 102b. Next, the mechanical fastener 508b is removed from the metal angle 508a freeing the battens 507 to be lifted from the weather barrier 500a. Once the battens 507 are removed, the weather barrier 500a can be lifted up as it will no longer being held in place by the battens 507. Once an additional story is added onto the original dwelling unit as described in FIG. 1E, the removable roof system is re-attached to the new roof structure in the same manner.

A specific part in the roof structure 106 called the vertical circulation panel 110 is removable as well. This removable vertical circulation panel 110 is located in the area that the future staircase is to be installed. This vertical circulation panel 110 varies depending on the width of the stairway and number of stairs included in the stairway, but in most cases the panel will be approximately 4 feet wide by 12-15 feet long. The removable panel 110 is framed as a traditional floor would be with sheathing 501 and roof joists 502, but it is hung via a joist hanger or metal Z channel 503 from the part of the roof structure that is fixed 106. The purpose of attaching the removable panel 110 to the roof structure 106 via a joist hanger 503 is so that the vertical circulation panel 110 can be unfastened to the existing structure 106 without compromising the structural integrity of the roof structure. To add a staircase into the original dwelling unit, one must first "unhang" the removable panel 110. Then a stair of equal width and length can either be prefabricated offsite and lowered through the resulting opening 112 or built onsite on the first floor of the original dwelling unit 100.

As see in FIG. 2B, the removable upper roof 108 is stacked on top of the original dwelling unit 100. This axonometric drawing shows the layers that compose the removable roof assembly 108, including the compression bracket 500b, which comprises a batten 507, a metal angle 508a, an angle fastener 508b, a coping piece 509, a fascia 510 & 511, a steel strap 512, and mechanical fasteners 513 and the weather barrier 500a, which comprises a substrate 504, an insulation 505, and a vapor and air barrier 506. All of these components 504-513 sit atop the original dwelling roof structure 106.

Figure 3A:
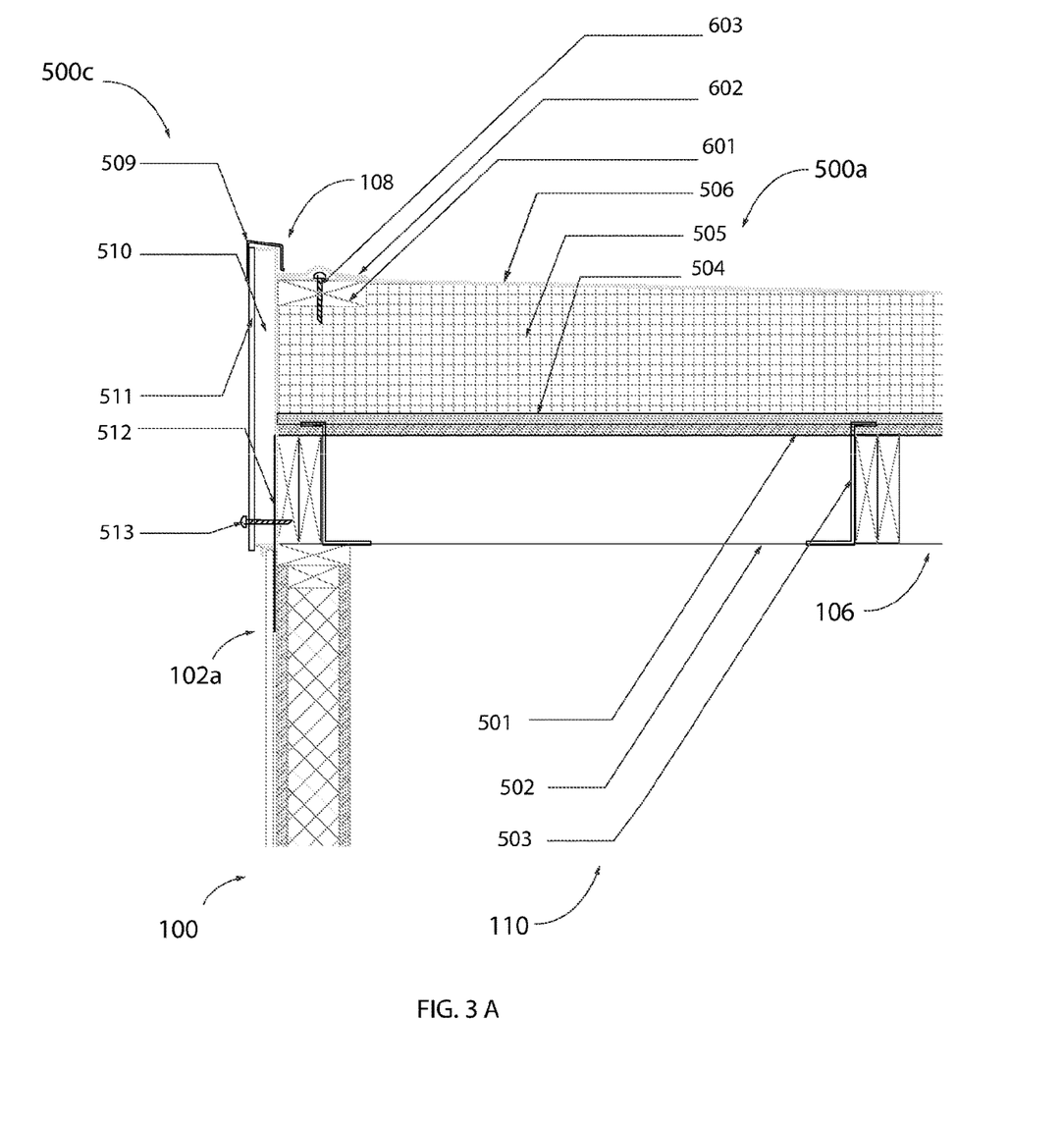
FIG. 3A illustrates a detailed section view of the removable roof system illustrated in FIG. 1A with an alternative method to connect the vapor and air barrier to the dwelling unit.

FIG. 3A illustrates an alternative method for attaching the vapor and air barrier 506. In the embodiment illustrated in FIG. 3, there are no battens. Instead the vapor and air barrier 506 is mechanically fastened with removable fasteners 603 to a piece of pressure treated lumber 601 which resides inside the weather barrier 500a. To prevent any water penetration, additional vapor and air barrier 602 can be heat welded overtop the fastener.

Figure 3B:
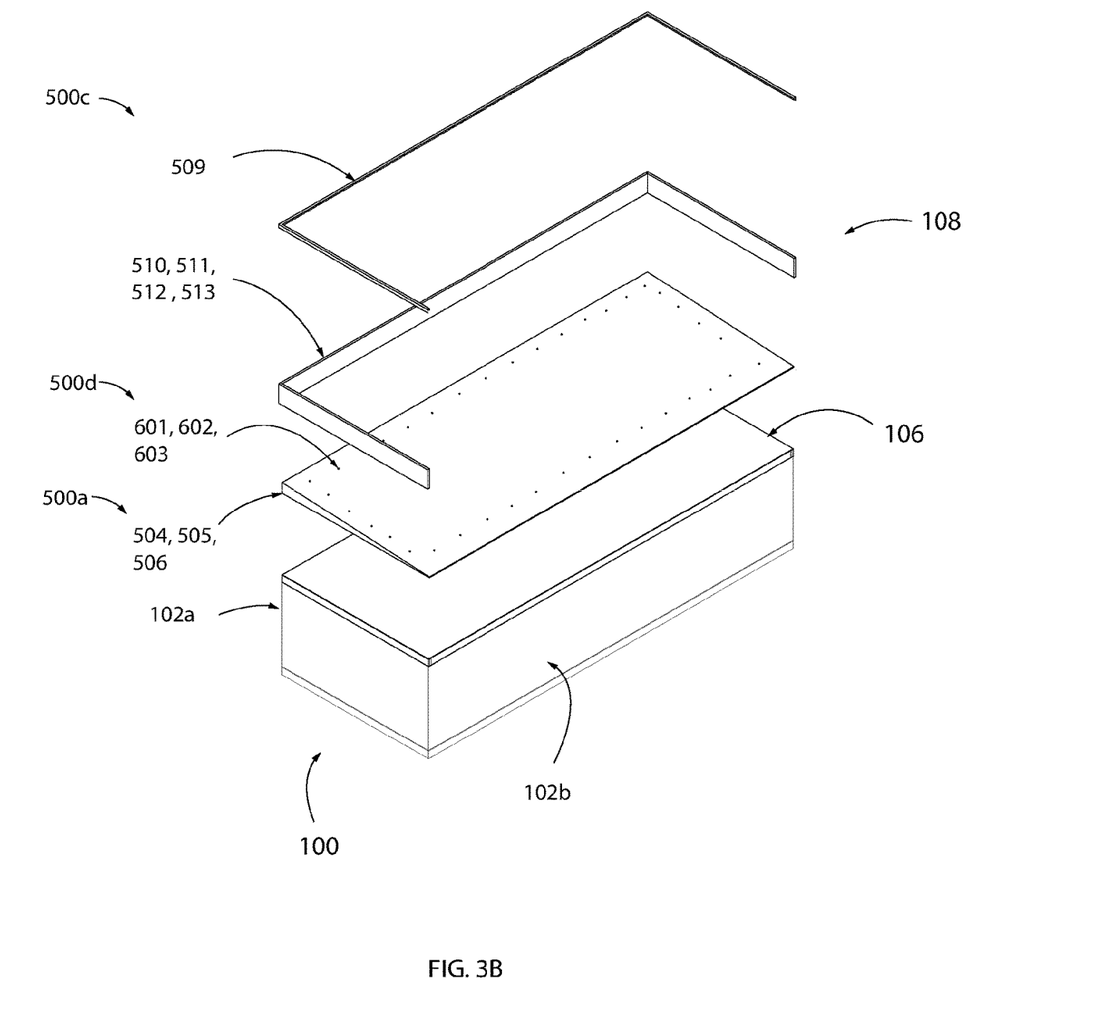
FIG. 3B illustrates an exploded axonometric drawing showing the original dwelling unit's removable and non-removable parts illustrated in FIG. 1A with the alternative method to connect the vapor and air barrier illustrated in FIG. 3A.

FIG. 3B illustrates the removable roof system 108 being stacked on top of the original dwelling unit 100. This axonometric drawing shows the layers that compose the removable roof 108, including a modified compression bracket 500c without batten system (509-513), the alternative method for fastening the vapor and air barrier 500d (601-603) and the weather barrier 500a (504-506). All of the removable roof assembly components (504-506, 509-513, 601-603) sit atop the original dwelling roof structure 106.

Figure 4:
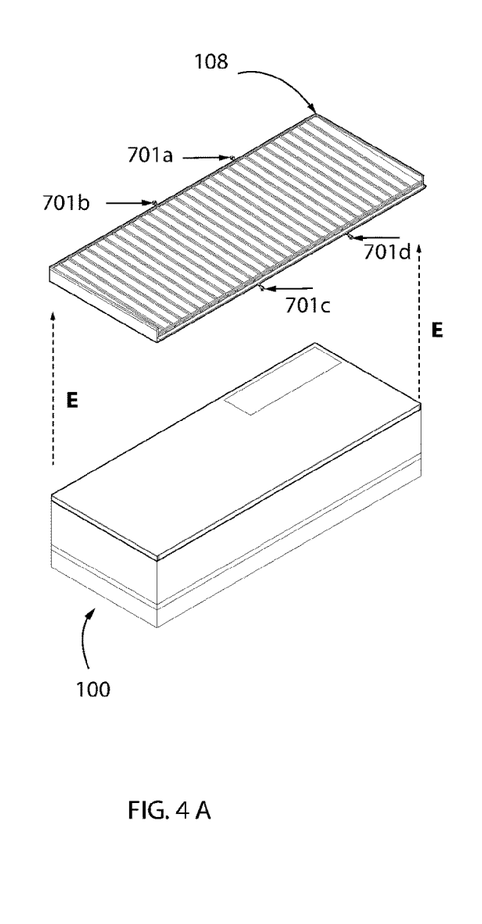
FIG. 4A illustrates the entire upper roof being removed at once.
FIG. 4B illustrates the structural panel being removed afterwards.

Now referring to FIG. 4A, which depicts the removable upper roof system 108 in in the process of being removed as shown by Arrow E, which illustrates the vertical removal of the upper roof assembly 108 from original dwelling unit 100. In this example, a crane or other large piece of equipment removes the entire upper roof 108. The crane secures the upper roof assembly 108 for lifting by attaching hooks onto the metal eyelets 701a-701d. By having four eyelets, the lifting force is distributed evenly along the upper roof assembly 108 and it can be lifted while maintaining parallel with the ground. In other embodiments, there can be 6, 8, 10, 12, or 16 metal eyelets spaced around the perimeter of the removable upper roof system 108 to facilitate the removal of removable upper roof system 108.

FIG. 4B illustrates the vertical circulation panel 110 in the process of being removed as shown by Arrow F, which illustrates the vertical removal of the vertical circulation panel 110 to enable space for a future staircase. This panel 110 can be lifted with or without the use of a crane.

Figures 5A, 5B:
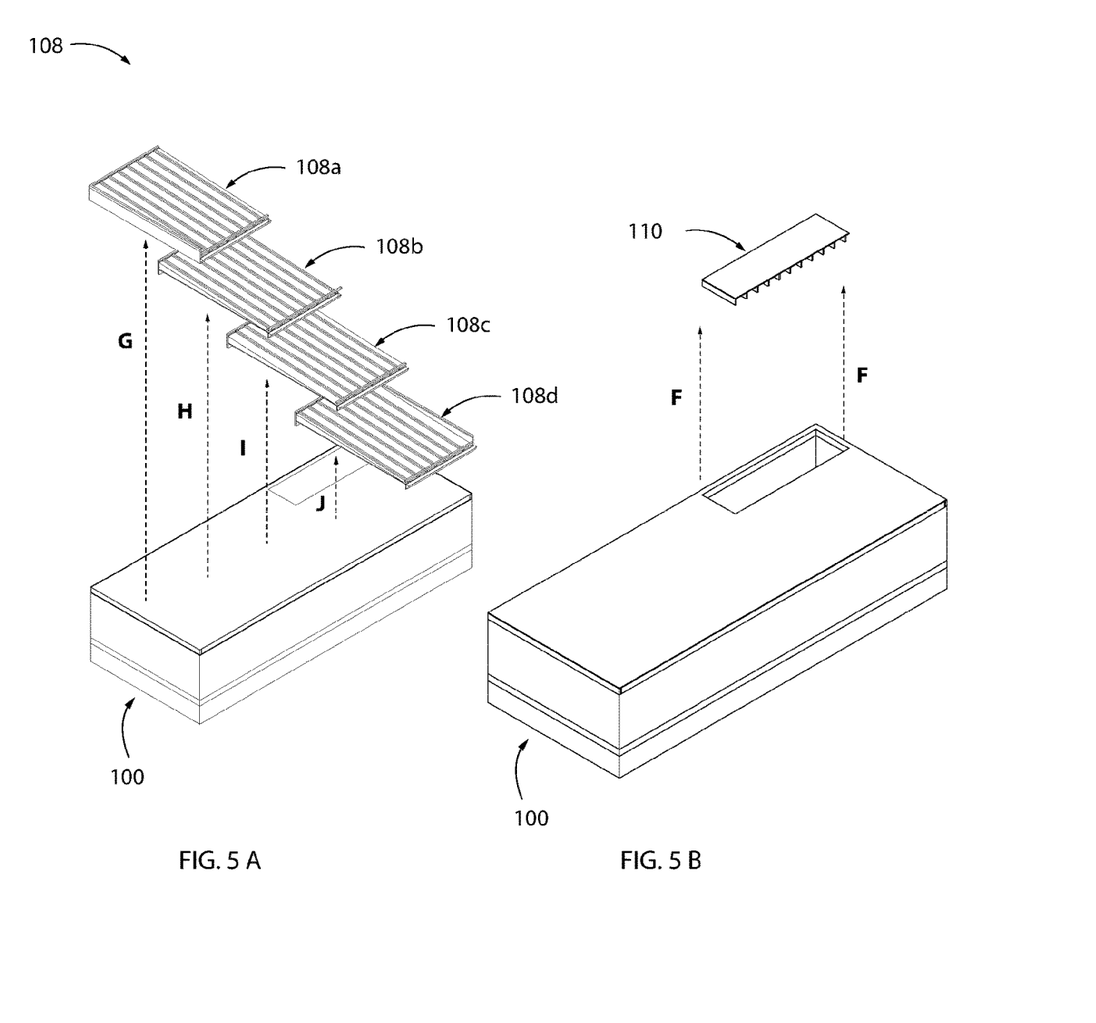
FIG. 5A illustrates the upper roof being removed in sections.
FIG. 5B illustrates the structural panel being removed afterwards.

Now referring to FIG. 5A, which illustrates the upper roof assembly 108 in the process of being removed (Arrow G-J) from original dwelling unit 100 in sections 108a-d. These smaller sections 108a-d allow the roof's removal without using heavy mechanical equipment to lift each piece. These pieces can vary in width, between four feet wide and eight feet wide. In an alternative embodiment, a portion of the removable roof assembly 108 may be removed were it is desired to add a half-floor addition. In such an embodiment, sections 108b-d may be removed and a second story can be added onto the original dwelling unit 100 where section 108a can remain in place. It is within the scope of the invention to remove a single section, two sections, three sections or four sections of the removable upper roof assembly 108 to meet the expansion needs of the owner.

FIG. 5B illustrates the vertical circulation panel 110 in the process of being removed as shown by Arrow F, which illustrates the vertical removal of the vertical circulation panel 110, to enable space for a future stair. The vertical circulation panel 110 can be lifted with or without the use of a crane.

Figure 6:
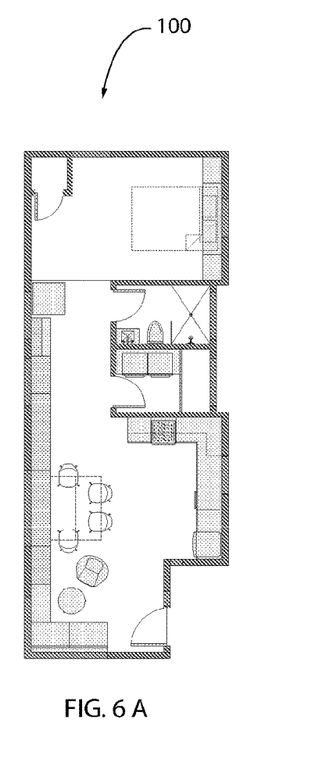
FIGS. 6A-C illustrate schematic architectural plans for an original dwelling unit and second story addition.

FIGS. 6A-6C illustrate schematic architectural plans for an original dwelling unit 100 and as well as plans for an original dwelling unit with a completed second story addition 400. FIG. 6A illustrates an embodiment of a first floor plan of the original dwelling unit 100. In the embodiment illustrate in FIGS. 6A-6C, the building width is 16 feet and the length is 40 feet. FIG. 6A illustrates an example of the first floor plan prior to a staircase being added. FIG. 6B illustrates the first floor plan with a stair 801 leading to the second story. FIG. 6C illustrates the second story with staircase 801.

In other embodiments, the original dwelling units dimensions may vary. The chart below illustrates various examples of original dwelling dimensions and dimensions of additions.

|  | Length (ft) | Width (ft) | Height (ft) |
| --- | --- | --- | --- |
| Original Dwelling Unit A | 16 | 40 | 10 |
| Vertical Addition A | 16 | 40 | 10 |
| Original Dwelling Unit B | 20 | 50 | 12 |
| Vertical Addition B | 20 | 50 | 12 |

Figure 7A:
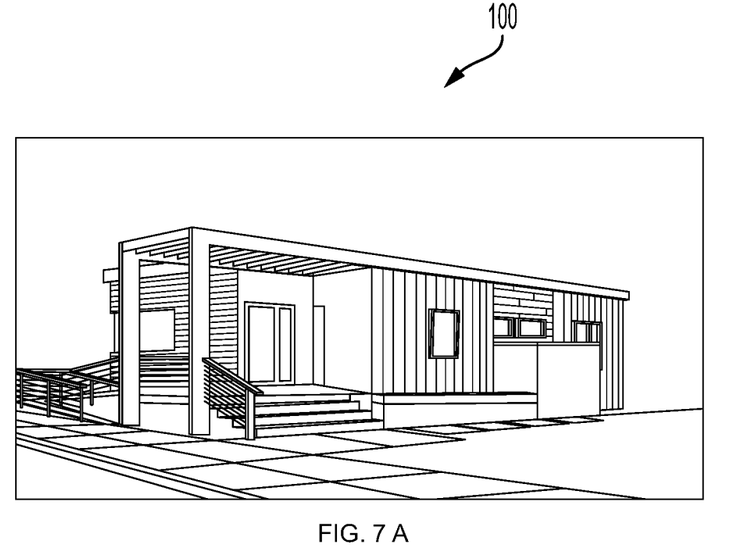
FIGS. 7A-B illustrate an architectural rendering of an original dwelling unit and second story addition.
Figure 7B:
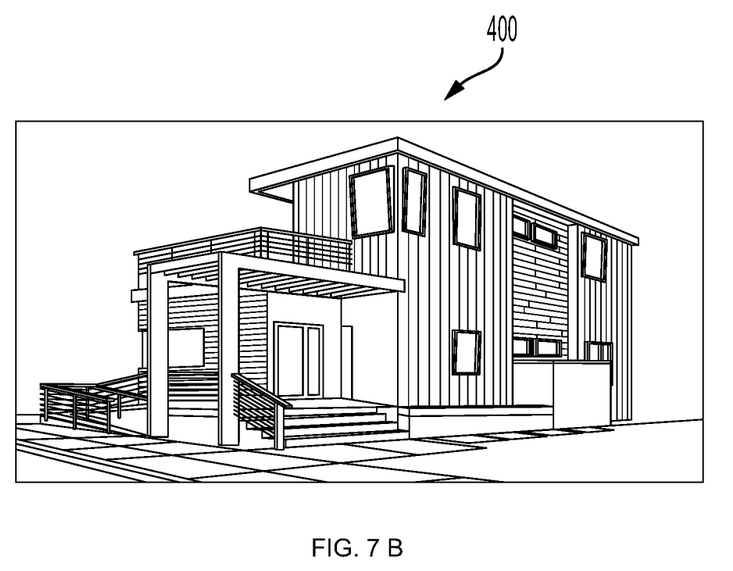

FIGS. 7A-7B illustrate an architectural rendering of an original dwelling unit 100 and a rendering of an original dwelling unit with second story addition 400 FIG. 7A illustrates the original dwelling unit 100 as a three dimensional rendering on a city street. FIG. 7B illustrates the original dwelling unit with a second story addition 400.

EXAMPLES

Example 1

A removable roof assembly for attachment to a roof substructure of a housing unit. The roof substructure comprises a length having a longitudinal dimension and a width having a transverse dimension. The roof substructure comprises a first end positioned at one end of the transverse dimension and a second end at the other end of the transverse dimension. The removable roof assembly comprises a weather barrier. The weather barrier comprises a substrate layer and an insulation layer having a longitudinal axis and a transverse axis, The insulation layer comprises a first thickness at one end of the transverse axis and a second thickness at the other end of the transverse axis. The weather barrier further comprises a vapor and air barrier. The substrate layer is removably positionable abutting the roof substructure of the housing unit. The insulation layer is removably positionable abutting the substrate layer. The vapor and air barrier is removably positionable abutting the insulation layer. The transverse axis is substantially parallel to the transverse dimension. The first thickness is adjacent the first end and the second thickness is adjacent the second end. The removable roof assembly comprises a compression bracket system. The compression bracket system is positioned adjacent the first end of the roof substructure. The compression bracket system extends along the first thickness of the insulation layer. The compression bracket system is configured to releasably attach the removable roof assembly to the roof substructure of the housing unit.

Example 2

The removable roof assembly of Example 1, wherein the compression bracket system comprises a batten, a metal angle, a coping piece, a fascia assembly, a steel strap, and a plurality of mechanical fasteners.

Example 3

The removable roof assembly of Example 1 or 2, further comprising a second compression bracket system. The second compression bracket system is positioned adjacent the second end of the roof substructure. The second compression bracket system extends along the second thickness of the insulation layer. The second compression bracket system is configured to releasably attach the removable roof assembly to the roof substructure of the housing unit.

Example 4

The removable roof assembly of Examples 1, 2, or 3, wherein the longitudinal dimension is greater than the transverse dimension.

Example 5

The removable roof assembly of Examples 1, 2, 3, or 4, wherein the first thickness is greater than the second thickness.

Example 6

The removable roof assembly of Examples 1, 2, 3, 4, or 5, further comprising a removable vertical circulation panel. The removable vertical circulation panel comprises rafters and sheathing. The removable vertical circulation panel is removably positionable within an opening in the roof substructure.

Example 7

The removable roof assembly of Examples 1, 2, 3, 4, 5, or 6, further comprising a solar panel assembly positioned adjacent the weather barrier.

Example 8

The removable roof assembly of Examples 1, 2, 3, 4, 5, 6, or 7, further comprising a plurality of lifting eyelets. The plurality of lifting eyelets are configured to facilitate a removal and reinstallation of the removable roof assembly.

Example 9

A method for vertically expanding a housing unit, comprising the removable roof assembly of Examples 3, 4, 5, 6, 7, or 8. The method comprises the steps of releasing the compression bracket system, releasing the second compression bracket system, removing the removable roof assembly from the roof substructure of the housing unit, installing a second story comprising a four-walled housing unit on the roof substructure, wherein the four-walled housing unit comprises a second roof substructure, reinstalling the removable roof assembly to the second roof substructure of the second story, and securing the removable roof assembly to the second story with the compression bracket system and the second compression bracket system.

Example 10

A method for vertically expanding a housing unit, comprising the removable roof assembly of claim 6, 7, or 9. The method comprises the steps of releasing the compression bracket system, releasing the second compression bracket system, removing the removable roof assembly from the roof substructure of the housing unit, removing the removable vertical circulation panel, installing a staircase in the opening in the roof substructure, installing a second story comprising a four-walled housing unit on the roof substructure, wherein the four-walled housing unit comprises a second roof substructure, reinstalling the removable roof assembly to the second roof substructure of the second story, and securing the removable roof assembly to the second story with the compression bracket system and the second compression bracket system.

Example 11

A removable roof system for modular construction comprising a weather barrier comprising. The weather barrier comprises a substrate layer, an insulation layer, and a vapor and air barrier. The removable roof system further comprises a compression bracket system. The compression bracket system comprises a batten, a metal angle, a coping piece, a fascia assembly, a steel strap, and mechanical fasteners. The substrate layer is removably positionable abutting a roof substructure of a modular structure. The insulation layer is removably positionable abutting the substrate layer. The vapor and air barrier is removably positionable abutting the insulation layer. The compression bracket system is configured to releasably attach the removable roof assembly to the roof substructure of the modular structure.

Example 12

The removable roof system of Example 11, wherein the compression bracket system applies compression force to hold the weather barrier to the modular structure.

Example 13

The removable roof system of Examples 11 or 12, wherein the modular structure comprises a residential dwelling.

Example 14

The removable roof system of Examples 11, 12, or 13, further comprising a vertical circulation panel positioned below the weather barrier.

Example 15

The removable roof system of Example 14, wherein the vertical circulation panel is recievably positioned within an opening in the roof substructure.

Example 16

A removable roof assembly for attachment to a roof substructure of a modular housing unit. The roof substructure comprises a length having a longitudinal dimension and a width having a transverse dimension. The roof substructure comprises a first end positioned at one end of the transverse dimension and a second end at the other end of the transverse dimension. The removable roof assembly comprises an upper roof assembly. The upper roof assembly comprises a substrate layer and an insulation layer having a longitudinal axis and a transverse axis. The insulation layer comprises a first thickness at one end of the transverse axis and a second thickness at the other end of the transverse axis. The upper roof assembly further comprises a vapor and air barrier. The substrate layer is removably positionable abutting the roof substructure of the modular housing unit. The insulation layer is removably positionable abutting the substrate layer. The vapor and air barrier is removably positionable abutting the insulation layer. The transverse axis is substantially parallel to the transverse dimension. The first thickness is adjacent the first end and the second thickness is adjacent the second end. The removable roof assembly further comprises a caster system. The caster system permits the upper roof assembly to slide relative to the roof substructure of the modular housing unit. The removable roof assembly further comprises a compression bracket system. The compression bracket system is positioned adjacent the first end of the roof substructure. The compression bracket system extends along the first thickness of the insulation layer. The compression bracket system is configured to releasably attach the removable roof assembly to the roof substructure of the modular housing unit.

Example 17

The removable roof assembly of Example 16, wherein the caster system comprises a male-female connection, and wherein the upper roof assembly is configured to slide relative to the modular housing unit along the longitudinal dimension.

Example 18

The removable roof assembly of Example 16, wherein the caster system comprises a male-female connection, and wherein the upper roof assembly is configured to slide relative to the modular housing unit along the transverse dimension.

Example 19

A method for vertically expanding a modular housing unit, comprising the removable roof assembly of Example 17. The method comprises the steps of releasing the compression bracket system, sliding the removable roof assembly on the caster system along the longitudinal dimension to remove the removable roof assembly from the modular housing unit, installing a second story comprising a four-walled modular housing unit on the roof substructure, wherein the four-walled modular housing unit comprises a second roof substructure, reinstalling the removable roof assembly to the second roof substructure of the second story by sliding the removable roof assembly on a second caster system of the second roof substructure along a longitudinal dimension of the second roof substructure, and securing the removable roof assembly to the second story with the compression bracket system and the second compression bracket system.

Example 20

A method for vertically expanding a modular housing unit, comprising the removable roof assembly of Example 18. The method comprises the steps of releasing the compression bracket system, sliding the removable roof assembly on the caster system along the transverse dimension to remove the removable roof assembly from the modular housing unit, installing a second story comprising a four-walled modular housing unit on the roof substructure, wherein the four-walled modular housing unit comprises a second roof substructure, reinstalling the removable roof assembly to the second roof substructure of the second story by sliding the removable roof assembly on a second caster system of the second roof substructure along a transverse dimension of the second roof substructure, and securing the removable roof assembly to the second story with the compression bracket system and the second compression bracket system.

Various features and characteristics of removable roof system are described in this specification and illustrated in the drawings to provide an overall understanding of the disclosed apparatus. It is understood that the various features and characteristics described in this specification and illustrated in the drawings can be combined in any suitable manner regardless of whether such features and characteristics are expressly described or illustrated in combination in this specification. The Inventors and the Applicant expressly intend such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements (e.g., 35 U.S.C. § 112(a) and Article 123(2) EPC). The systems and methods described in this specification can comprise, consist of, or consist essentially of the various features and characteristics described in this specification.

The examples presented herein are intended to illustrate potential and specific implementations of the present disclosure. It can be appreciated that the examples are intended primarily for purposes of illustration of the disclosure for those skilled in the art. No particular aspect or aspects of the examples are necessarily intended to limit the scope of the present disclosure. For example, those skilled in the art will appreciate that the fasteners described herein (e.g., screws) may be replaced or supplemented by other suitable fastening means including a variety of other types of mechanical fastening devices (e.g., nails, rivets, magnets, or others). In another example, a particular choice of construction material (e.g., aluminum, plastic, steel, etc.) may be replaced or supplemented by another type of material which is suitable for the same or similar structure or function.

Any element expressed herein as a means for performing a specified function is intended to encompass any way of performing that function including, for example, a combination of elements that performs that function. Furthermore the disclosure, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

It will be appreciated that, for convenience and clarity of disclosure, terms describing relative orientation or spatial positioning such as "proximal," "distal," "vertical," "horizontal," "up," "down," "top," "front," "back," "bottom," "upward," or "downward" may be used at times herein with respect to the drawings and text description in association with various embodiments of the disclosure. However, such terms are primarily used for illustrative purposes and are not necessarily intended to be limiting in nature.

It is to be understood that the figures and descriptions of the present disclosure have been simplified to illustrate elements that are relevant for a clear understanding of the present disclosure, while eliminating, for purposes of clarity, other elements. Those of ordinary skill in the art will recognize, however, that these and other elements may be desirable. However, because such elements are well known in the art, and because they do not facilitate a better understanding of the present disclosure, a discussion of such elements is not provided herein. It should be appreciated that the figures are presented for illustrative purposes and not as construction drawings. Omitted details and modifications or alternative embodiments are within the purview of persons of ordinary skill in the art. For example, there may be variations to these diagrams or the operations described herein without departing from the spirit of the disclosure.

It can be appreciated that, in certain aspects of the present disclosure, a single component may be replaced by multiple components, and multiple components may be replaced by a single component, to provide an element or structure or to perform a given function or functions. Except where such substitution would not be operative to practice certain embodiments of the present disclosure, such substitution is considered within the scope of the present disclosure.

While various embodiments of the disclosure have been described herein, it should be apparent, however, that various modifications, alterations and adaptations to those embodiments may occur to persons skilled in the art with the attainment of some or all of the advantages of the present disclosure. The disclosed embodiments are therefore intended to include all such modifications, alterations and adaptations without departing from the scope and spirit of the present disclosure as claimed.

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A removable roof assembly for attachment to a roof substructure of a housing unit, wherein the roof substructure comprises a length having a longitudinal dimension and a width having a transverse dimension, wherein the roof substructure comprises a first end positioned at one end of the transverse dimension and a second end at the other end of the transverse dimension, wherein the removable roof assembly comprises:

a weather barrier comprising:
      a substrate layer;
      an insulation layer having a longitudinal axis and a transverse axis, wherein the insulation layer comprises a first thickness at one end of the transverse axis and a second thickness at the other end of the transverse axis; and
      a vapor and air barrier, wherein the substrate layer is removably positionable abutting the roof substructure of the housing unit, wherein the insulation layer is removably positionable abutting the substrate layer, wherein the vapor and air barrier is removably positionable abutting the insulation layer, wherein the transverse axis is substantially parallel to the transverse dimension, and wherein the first thickness is adjacent the first end and the second thickness is adjacent the second end; and a compression bracket system, wherein the compression bracket system is positioned adjacent the first end of the roof substructure, wherein the compression bracket system extends along the first thickness of the insulation layer, wherein the compression bracket system is configured to releasably attach the removable roof assembly to the roof substructure of the housing unit, and wherein the compression bracket system comprises:
      a batten;
      a metal angle;
      a coping piece;
      a fascia assembly;
      a steel strap; and
      a plurality of mechanical fasteners.

2. The removable roof assembly of claim 1, further comprising a second compression bracket system, wherein the second compression bracket system is positioned adjacent the second end of the roof substructure, wherein the second compression bracket system extends along the second thickness of the insulation layer, and wherein the second compression bracket system is configured to releasably attach the removable roof assembly to the roof substructure of the housing unit.

3. The removable roof assembly of claim 1, wherein the longitudinal dimension is greater than the transverse dimension.

4. The removable roof assembly of claim 1, wherein the first thickness is greater than the second thickness.

5. The removable roof assembly of claim 2, further comprising a removable vertical circulation panel, wherein the removable vertical circulation panel comprises rafters and sheathing, wherein the removable vertical circulation panel is removably positionable within an opening in the roof substructure.

6. The removable roof assembly of claim 1, further comprising a solar panel assembly positioned adjacent the weather barrier.

7. The removable roof assembly of claim 2, further comprising a plurality of lifting eyelets, wherein the plurality of lifting eyelets are configured to facilitate a removal and reinstallation of the removable roof assembly.

8. A method for vertically expanding a housing unit, comprising the removable roof assembly of claim 2, wherein the method comprises:
releasing the compression bracket system;
releasing the second compression bracket system;
removing the removable roof assembly from the roof substructure of the housing unit;
installing a second story comprising a four-walled housing unit on the roof substructure, wherein the four-walled housing unit comprises a second roof substructure;
reinstalling the removable roof assembly to the second roof substructure of the second story; and
securing the removable roof assembly to the second story with the compression bracket system and the second compression bracket system.

9. A method for vertically expanding a housing unit, comprising a removable roof assembly for attachment to a roof substructure of the housing unit, wherein the roof substructure comprises a length having a longitudinal dimension and a width having a transverse dimension, wherein the roof substructure comprises a first end positioned at one end of the transverse dimension and a second end at the other end of the transverse dimension, wherein the removable roof assembly comprises:
a weather barrier comprising:
an substrate layer;
an insulation layer having a longitudinal axis and a transverse axis, wherein the insulation layer comprises a first thickness at one end of the transverse axis and a second thickness at the other end of the transverse axis; and
a vapor and air barrier, wherein the substrate layer is removably postionable abutting the roof substructure of the housing unit, wherein the insulation layer is removably positionable abutting the substrate layer, wherein the vapor and air barrier is removably positionable abutting the insulation layer, wherein the transverse axis is substantially parallel to the transverse dimension, and wherein the first thickness is adjacent to the second end;
a compression bracket system, wherein the compression bracket system is positioned adjacent the first end of the roof substructure, wherein the compression bracket system extends along the first thickness of the roof substructure, wherein the compression bracket system is configured to releasably attach the removable roof assembly to the roof substructure of the housing unit; a second compression bracket system, wherein the second compression bracket system is positioned adjacent the second end of the roof substructure, wherein the second compression bracket system extends along the second thickness of the insulation layer, and wherein the second compression bracket system is configured to releasably attach the removable roof assembly to the roof substructure of the housing unit; and
a removable vertical circulation panel, wherein the removable vertical circulation panel comprises rafters and sheathing, wherein the removable circulation panel is removably positionable within an opening in the roof substructure, wherein the method comprises:
releasing the compression bracket system;
releasing the second compression bracket system;
removing the removable roof assembly from the roof substructure of the housing unit;
removing the removable vertical circulation panel;
installing a staircase in the opening in the roof substructure;
installing a second story comprising a four-walled housing unit on the roof substructure, wherein the four-walled housing unit comprises a second roof substructure;
reinstalling the removable roof assembly to the second roof substructure of the second story; and
securing the removable roof assembly to the second story with the compression bracket system and the second compression bracket system.

10. A removable roof system for modular construction comprising:
a weather barrier comprising:
a substrate layer;
an insulation layer; and
a vapor and air barrier; and
a compression bracket system comprising:
a batten;
a metal angle;
a coping piece;
a fascia assembly;
a steel strap; and
mechanical fasteners,
wherein the substrate layer is removably positionable abutting a roof substructure of a modular structure, wherein the insulation layer is removably positionable abutting the substrate layer, wherein the vapor and air barrier is removably positionable abutting the insulation layer, and wherein the compression bracket system is configured to releasably attach the removable roof assembly to the roof substructure of the modular structure.

11. The removable roof system of claim 10, wherein the compression bracket system applies compression force to hold the weather barrier to the modular structure.

12. The removable roof system of claim 11, wherein the modular structure comprises a residential dwelling.

13. The removable roof system of claim 10, further comprising a vertical circulation panel positioned below the weather barrier.

14. The removable roof system of claim 13, wherein the vertical circulation panel is receivably positioned within an opening in the roof substructure.

\* \* \* \* \*